United States Patent
Kato et al.

(10) Patent No.: US 10,502,261 B2
(45) Date of Patent: Dec. 10, 2019

(54) VEHICULAR POWER TRANSMISSION DEVICE

(71) Applicant: TOYOTA JIDOSHA KABUSHIKI KAISHA, Toyota-shi, Aichi-ken (JP)

(72) Inventors: Koichi Kato, Toyota (JP); Shinichi Baba, Toyota (JP); Shinichiro Suenaga, Nagoya (JP); Iori Matsuda, Toyota (JP); Michitaka Tsuchida, Miyoshi (JP); Akiko Nishimine, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 15/722,207

(22) Filed: Oct. 2, 2017

(65) Prior Publication Data
US 2018/0100541 A1   Apr. 12, 2018

(30) Foreign Application Priority Data
Oct. 6, 2016 (JP) .................. 2016-198546

(51) Int. Cl.
*F16C 19/38* (2006.01)
*B60K 6/445* (2007.10)
*F16C 33/58* (2006.01)

(52) U.S. Cl.
CPC ............ *F16C 19/385* (2013.01); *B60K 6/445* (2013.01); *F16C 33/585* (2013.01); *B60Y 2200/92* (2013.01); *B60Y 2410/102* (2013.01); *F16C 2326/06* (2013.01); *Y10S 903/902* (2013.01)

(58) Field of Classification Search
CPC .... F16C 19/385; F16C 33/585; F16C 19/547; F16C 35/042; F16C 39/02; B60K 6/365; B60K 6/48; B60K 6/547; B60K 6/445; F16H 3/727
See application file for complete search history.

(56) References Cited

U.S. PATENT DOCUMENTS

| | | | | |
|---|---|---|---|---|
| 5,334,466 A * | 8/1994 | Yasui | .................. | G03F 1/22 378/34 |
| 5,806,371 A | 9/1998 | Hibbler et al. | | |
| 6,216,560 B1 * | 4/2001 | Takada | ................. | B60K 17/105 475/82 |
| 7,237,638 B2 * | 7/2007 | Ishikawa | .................. | F16H 9/18 180/219 |
| 7,516,685 B2 * | 4/2009 | Ebihara | ................. | B60K 17/28 74/15.6 |
| 2006/0058138 A1 * | 3/2006 | Morita | ..................... | F16H 9/18 474/144 |
| 2006/0084541 A1 * | 4/2006 | Nosaka | ..................... | F16D 3/68 474/170 |

(Continued)

FOREIGN PATENT DOCUMENTS

| | | |
|---|---|---|
| JP | 2013-023036 A | 2/2013 |
| JP | 2013-124742 A | 6/2013 |

*Primary Examiner* — Zakaria Elahmadi
(74) *Attorney, Agent, or Firm* — Oliff PLC

(57) ABSTRACT

A concave portion provided in at least one of the first assembled surface, and other assembled surfaces for fastening the driving force source, in the region corresponding to the outer race of the tapered roller bearing, the other assembled surfaces provided to one of the fixed component and the driving force source.

4 Claims, 8 Drawing Sheets

(56) References Cited

U.S. PATENT DOCUMENTS

| | | | |
|---|---|---|---|
| 2008/0287251 A1* | 11/2008 | Shioiri | F16D 11/10 |
| | | | 476/10 |
| 2010/0218638 A1* | 9/2010 | Shiina | B62D 5/008 |
| | | | 74/496 |
| 2010/0224436 A1* | 9/2010 | Shiina | B62D 5/008 |
| | | | 180/444 |
| 2011/0011205 A1* | 1/2011 | Nonomura | F16H 57/0402 |
| | | | 74/606 R |
| 2012/0168275 A1* | 7/2012 | Morisawa | B60T 1/005 |
| | | | 192/219.5 |
| 2013/0184111 A1* | 7/2013 | Tsuchida | B60K 6/40 |
| | | | 475/5 |
| 2013/0305878 A1* | 11/2013 | Seno | F16H 57/0423 |
| | | | 74/665 A |
| 2017/0335941 A1* | 11/2017 | Hoshina | F16H 49/001 |

* cited by examiner

VEHICULAR POWER TRANSMISSION DEVICE

INCORPORATION BY REFERENCE

The disclosure of Japanese Patent Application No. 2016-198546 filed on Oct. 6, 2016 including the specification, drawings and abstract is incorporated herein by reference in its entirety.

BACKGROUND

1. Technical Field

The disclosure relates to a vehicular power transmission device, having a rotary shaft that transmits a driving force from a driving force source and that is rotatably supported via a tapered roller bearing while being pressurized in a direction of a rotational centerline thereof in a case member, and more particularly, to an art of enhancing the anti-seizure performance of the tapered roller bearing that rotatably supports the rotary shaft.

2. Description of Related Art

There is known a vehicular power transmission device having a rotary shaft that transmits a driving force from a driving force source and that is rotatably supported via a tapered roller bearing while being preloaded (pressurized) in a direction of a rotational centerline thereof in a transaxle case that functions as a case member. For example, a vehicular drive device described in Japanese Patent Application Publication No. 2013-124742 (JP 2013-124742 A) is such a vehicular power transmission device.

The transaxle case of the vehicular drive device of Japanese Patent Application Publication No. 2013-124742 (JP 2013-124742 A) is equipped with, for example, a cylindrical main body case and an end cover that closes up an opening of the main body case on an engine side. One end of the rotary shaft that transmits a driving force from the driving force source is rotatably supported by the aforementioned end cover corresponding to an end surface of the transaxle case, via the tapered roller bearing. Besides, the engine is fastened to an assembled surface that is formed on a top portion of a convex streak that is provided on an outer surface of the end cover, either directly or indirectly via a plate.

SUMMARY

By the way, the convex streak having a top surface on which the assembled surface is formed is thicker than the other part, and hence functions as a reinforcing rib. However, for reasons of downsizing of the vehicular drive device and the like, part of the convex streak that is provided on the outer surface of the end cover may be arranged in such a manner as to pass the vicinity of the rotational centerline of the rotary shaft. In such a case, as regards the rotary shaft that is rotatably supported via the tapered roller bearing while being preloaded (pressurized) in a direction of the rotational centerline, when a fixed component, for example, the engine is fastened to the assembled surface that is formed on the top surface of the convex streak, either directly or indirectly via the plate, the preload applied to the rotary shaft in the direction of the rotational centerline thereof increases unnecessarily. Therefore, the anti-seizure performance of the tapered roller bearing that rotatably supports the rotary shaft may deteriorate. In particular, when the temperature is low, the aforementioned preload further increases due to a difference in thermal expansion coefficient between the tapered roller bearing and the transaxle made of light alloy, so there is a great possibility of the aforementioned deterioration in the anti-seizure performance.

The disclosure can restrain the anti-seizure performance of a tapered roller bearing from deteriorating in the case where part of a convex streak having a top surface on which a mating surface to be fastened to a fixed component is formed is formed in the vicinity of a rotational centerline of a rotary shaft on an end surface of a case member of a vehicular power transmission device as described above.

As an aspect of the disclosure, a vehicular power transmission device includes a tapered roller bearing; a driving force source; a case member including an end surface, the end surface including a convex streak provided with a first assembled surface, a part of the convex streak provided on the end surface such that the part of the convex streak passes through a region corresponding to an outer race of the tapered roller bearing; a rotary shaft that transmits a driving force from the driving force source, the rotary shaft being supported in a rotating manner in a circumferential direction of the rotary shaft via the tapered roller bearing while being pressurized in a direction of a rotational centerline of the rotary shaft, in the case member, and one end of the rotary shaft being supported in a rotating manner by the end surface of the case member via the tapered roller bearing; a fastened state where the driving force source is fastened to the first assembled surface being one of a state where the driving force source is fastened to the first assembled surface via a fixed component, and a state of where the driving force source is directly fastened to the first assembled surface; and a concave portion provided in at least one of the first assembled surface and other assembled surfaces for fastening the driving force source, in the region corresponding to the outer race of the tapered roller bearing, the other assembled surfaces provided to one of the fixed component and the driving force source.

According to the aforementioned vehicular power transmission device, the convex portion is locally provided in at least one of the first assembled surface that is formed on the convex streak and other assembled surfaces for fastening the driving force source, in the region corresponding to the outer race of the tapered roller bearing. Therefore, with the fixed component fastened to the first assembled surface that is formed on the convex streak, the clearance between the assembled surfaces that face each other is enlarged in the region where the concave portion is formed. When the preload increases due to the fastening of the fixed component or the attainment of a low temperature as well as the fastening of the fixed component, the region including a position that is passed by a rotational central axis on the end surface of the case member can escape into the enlarged clearance. Thus, the preload applied to the tapered roller bearing is restrained from increasing, so the anti-seizure performance of the tapered roller bearing is restrained from deteriorating.

As another aspect of the disclosure, the driving force source may be fastened to the first assembled surface via the fixed component, the fixed component may be a plate-shaped component that is interposed between the driving force source and the end surface of the case member, the plate-shaped component may include a second assembled surface facing the first assembled surface at a side of the case member, and a third assembled surface provided at a side of the driving force source the driving force source may include a fourth assembled surface facing the third assembled surface at a side of the plate-shaped component, and the concave portion may be provided in at least one of the third assembled surface and the fourth assembled surface, in the region corresponding to the outer race of the tapered roller bearing.

According to the aforementioned vehicular power transmission device, the fixed component is the plate-shaped component that is interposed between the driving force source and the end surface of the case member. The second assembled surface facing the first assembled surface that is formed on the convex streak is formed on the case member side of the plate-shaped component, and the third assembled surface facing the fourth assembled surface that is formed on the driving force source is formed on the driving force source side of the plate-shaped component. The concave portion is formed in at least one of the second assembled surface, the third assembled surface, and the fourth assembled surface. In this manner, the concave portion is formed in at least one of the second assembled surface on the case side, the third assembled surface on the driving force source side, and the fourth assembled surface that is formed on the driving force source. Thus, with the plate-shaped component fastened to the first assembled surface that is formed on the convex streak, and with the driving force source fastened to the third assembled surface on the driving force source side of the plate-shaped component, the clearance between the assembled surfaces that face each other is enlarged in the region where the concave portion is formed. When the preload increases due to the fastening of the fixed component and the driving force source or the attainment of a low temperature as well as the fastening of the fixed component and the driving force source, the region including the position that is passed by the rotational central axis on the end surface of the case member can escape into the enlarged clearance.

As an aspect of the disclosure, the driving force source may directly fastened to the first assembled surface, the driving force source may include a fourth assembled surface facing the first assembled surface at a side of the case member, and the concave portion is provided in at least one of the first assembled surface and the fourth assembled surface.

According to the aforementioned vehicular power transmission device, the clearance between the assembled surfaces that face each other is enlarged in the region where the concave portion is formed. When the preload increases due to the fastening of the driving force source or the attainment of a low temperature as well as the fastening of the driving force source, the region including the position that is passed by the rotational central axis on the end surface of the case member can escape into the enlarged clearance.

The concave portion may be 100 to 300 μm in depth.

According to the aforementioned vehicular power transmission device, when the preload increases due to the fastening of the driving force source or the attainment of a low temperature as well as the fastening of the driving force source, the region including the position that is passed by the rotational central axis on the end surface of the case member can escape into the enlarged clearance. Also, the clearance between the assembled surfaces is not enlarged beyond necessity, so the sealing performance can be maintained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The driving force source is preferably an engine that is equipped with a one-way clutch that prevents a crankshaft from rotating in a reverse direction. A differential gear device is accommodated in a case member of the vehicular power transmission device. The differential gear device is equipped with a first rotary element to which the engine is coupled, a second rotary element that is coupled to a first electric motor, and a third rotary element that is coupled to a second electric motor. The plate-shaped component is a stator of the one-way clutch. In this manner, when the engine is out of operation, both the first electric motor and the second electric motor can simultaneously function as the driving force source.

The concave portion, which is formed in one of the assembled surface that is formed on the convex streak, the assembled surface on the case side of the fixed component, the assembled surface on the driving force source side of the fixed component, and the assembled surface that is formed on the driving force source in the region including the position that is passed by the rotational central axis of the rotary shaft, is preferably formed at a depth of 100 μm to several hundred μm below the other parts. In this manner, when the preload increases due to the fastening of the driving force source or the attainment of a low temperature as well as the fastening of the driving force source, the region including the position that is passed by the rotational central axis on the end surface of the case member can escape into the enlarged clearance. Also, the clearance between the assembled surfaces is not enlarged beyond necessity, so the sealing performance is maintained. A deformable high-viscosity fluid such as a sealing agent, a packing, a gasket or the like, or a solid sealing member is preferably interposed between the aforementioned assembled surfaces.

A power transmission device for a hybrid vehicle according to each of the embodiments of the disclosure will be described hereinafter in detail with reference to the drawings. Incidentally, in the following embodiments of the disclosure, the drawings are partially simplified or deformed as appropriate, and the dimensional ratios, shapes and the like of respective components are not necessarily depicted with precision.

The embodiments of the disclosure will be described hereinafter in detail with reference to the drawings.

Figure 1:
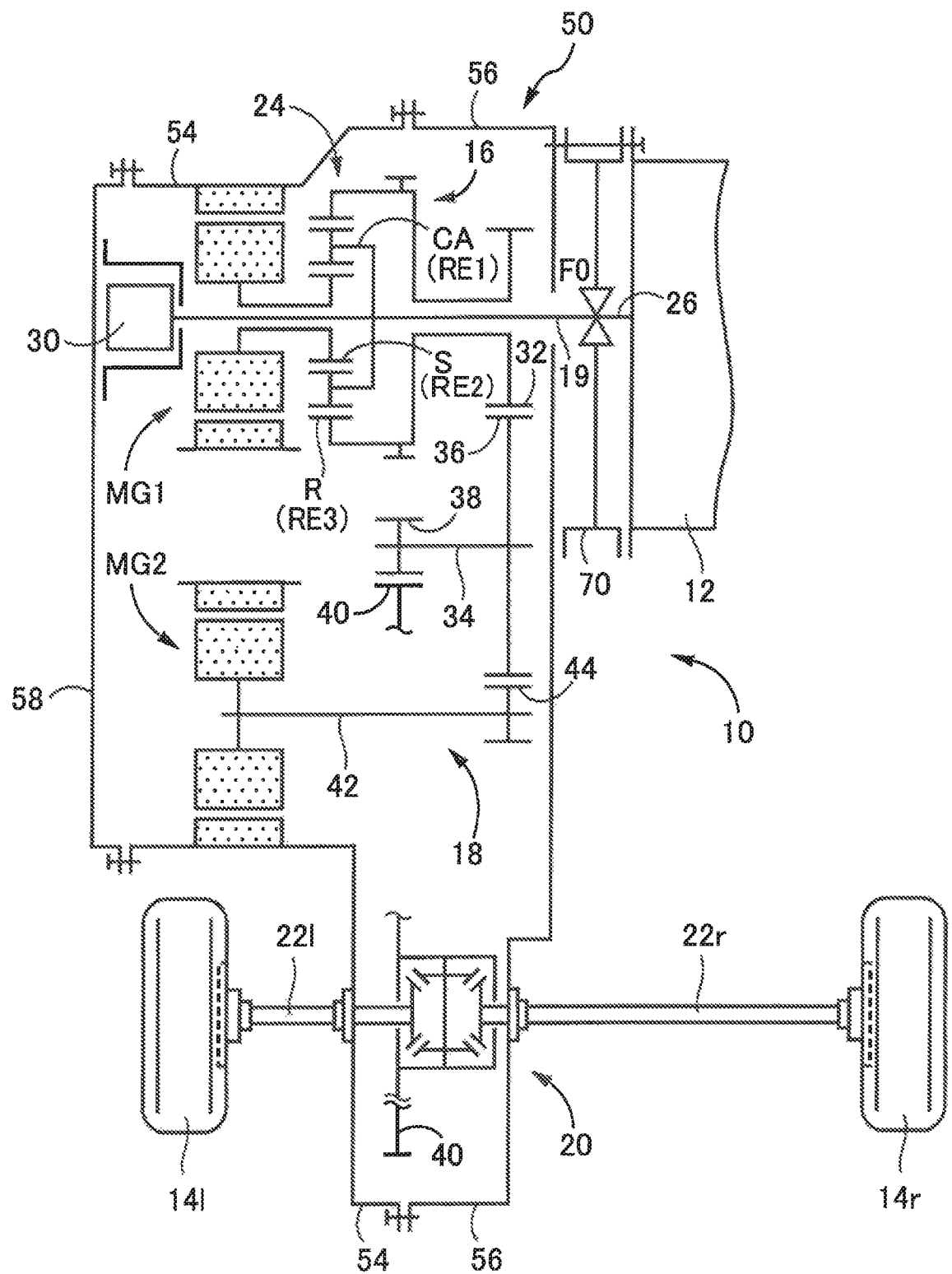
FIG. 1 is a skeleton diagram illustrating a configuration of a vehicular power transmission device according to one of the embodiments of the disclosure.

FIG. 1 is a skeleton diagram exemplifying a configuration of a hybrid vehicle power transmission device 10 (hereinafter referred to simply as the power transmission device 10) as part of a vehicle to which the disclosure is preferably applied. The power transmission device 10 shown in this FIG. 1 is preferably used for a front-engine front-drive (FF) vehicle, and is configured to be mainly equipped with a first drive unit 16, a second drive unit 18, and a pair of right and left axles 22r and 22l in a power transmission path between an engine 12 as a driving force source (a main power source) and a pair of right and left driving wheels 14r and 14l (hereinafter referred to simply as the driving wheels 14 in the case where they are not distinguished from each other in particular).

The engine 12 is, for example, an internal combustion engine such as a gasoline engine, a diesel engine or the like in which a driving force is generated through the combustion of fuel injected into cylinders. Besides, the first drive unit 16 is configured to be equipped with a planetary gear device 24 having three rotary elements, namely, a sun gear S, a carrier CA, and a ring gear R, and a first electric motor MG1 that is coupled to the sun gear S of the planetary gear device 24. Besides, a one-way clutch F0 that prevents the engine 12 from rotating in a reverse direction while allowing the engine 12 to rotate in a positive direction is provided between a crankshaft 26 as an output shaft of the engine 12 and a transaxle case (a case member) 50 as a non-rotary member. Accordingly, the engine 12 is prevented from rotating in the reverse direction by the one-way clutch F0.

The crankshaft 26 of the engine 12 is coupled to the carrier CA of the planetary gear device 24 via an input shaft 19 of the first drive unit 16. Besides, the crankshaft 26 is coupled to a mechanical oil pump 30. Besides, the ring gear R of the planetary gear device 24 as an output rotary member is coupled to an output gear 32. Incidentally, the output gear 32 is coupled to the driving wheels 14 such that power can be transmitted thereto, via a differential gear device 20 and the axles 22. Besides, the sun gear S of the planetary gear device 24 is coupled to the first electric motor MG1. That is, the planetary gear device 24 corresponds to a differential mechanism that is coupled to the crankshaft 26 of the engine 12 and that is equipped with the carrier CA, the sun gear S, and the ring gear R. The carrier CA is coupled to the one-way clutch F0 and serves as a first rotary element RE1. The sun gear S is coupled to the first electric motor MG1 and serves as a second rotary element RE2. The ring gear R is an output rotary member and serves as a third rotary element RE3.

The output gear 32 is meshed with a large-diameter gear 36 that is provided integrally with a counter driven shaft (rotary shaft) 34 that is parallel to the crankshaft 26 as an input shaft of the first drive unit 16. Besides, a small-diameter gear 38 that is provided integrally with the counter driven shaft 34 in the same manner is meshed with a ring gear 40 of the differential gear device 20. Besides, the large-diameter gear 36 is meshed with a second output gear 44 that is coupled to an output shaft 42 of a second electric motor MG2 that functions as a driving electric motor. That is, the second electric motor MG2 is coupled to the driving wheels 14 such that power can be transmitted thereto. It should be noted herein that each of the first electric motor MG1 and the second electric motor MG2 functions as a motor-generator functioning as a motor (a driving force source) that generates a driving force and a generator (an electric generator) that generates a reaction force.

In the power transmission device 10 configured as described above, rotation output from the engine 12 in the first drive unit 16 is output from the output gear 32 via the planetary gear device 24 as a differential mechanism, and is input to the ring gear 40 of the differential gear device 20 via the large-diameter gear 36 that is provided on the counter driven shaft 34 and the small-diameter gear 38 that has fewer teeth than the large-diameter gear 36. It should be noted herein that rotation output from the output gear 32 is reduced in speed at a predetermined speed reduction ratio that is determined by the number of teeth of the large-diameter gear 36 and the number of teeth of the small-diameter gear 38, and is input to the ring gear 40 of the differential gear device 20. Besides, the differential gear device 20 functions as a well-known final reduction gear.

Besides, according to the configuration, rotation of the first electric motor MG1 in the first drive unit 16 is transmitted to the output gear 32 via the planetary gear device 24, and is transmitted to the ring gear 40 of the differential gear device 20 via the large-diameter gear 36 and the small-diameter gear 38 that are provided on the counter driven shaft 34. Besides, according to the configuration, rotation of the second electric motor MG2 in the second drive unit 18 is transmitted to the large-diameter gear 36 that is provided on the counter driven shaft 34, via the output shaft 42 and the second output gear 44, and is transmitted to the ring gear 40 of the differential gear device 20 via the large-diameter gear 36 and the small-diameter gear 38. That is, the power transmission device 10 according to the present embodiment of the disclosure is configured such that each of the engine 12, the first electric motor MG1, and the second electric motor MG2 can be used as a drive source for running.

The power transmission device 10 according to the present embodiment of the disclosure is equipped with the transaxle case 50 that functions as a case member that accommodates a gear train having a four-axis configuration as described above. Incidentally, the gears shown in the skeleton diagram of FIG. 1 are helical gears.

The transaxle case 50 is constituted of a cylindrical main body case 54 obtained by coupling, for example, aluminum die cast pieces to each other, a first end cover 56 that closes an opening of the main body case 54 on the engine 12 side, and a second end cover 58 that closes an opening of the main body case 54 on the opposite side of the engine 12 side, and these components are coupled to one another in a liquid-tight manner via a predetermined sealing material. The first end cover 56 and the second end cover 58 are provided with axle holes 60l and 60r for allowing the axles 22l and 22r to pass therethrough, respectively. Besides, the first end cover 56 is provided with an input shaft through-hole 21 through which the input shaft 19 is passed.

Figure 2:
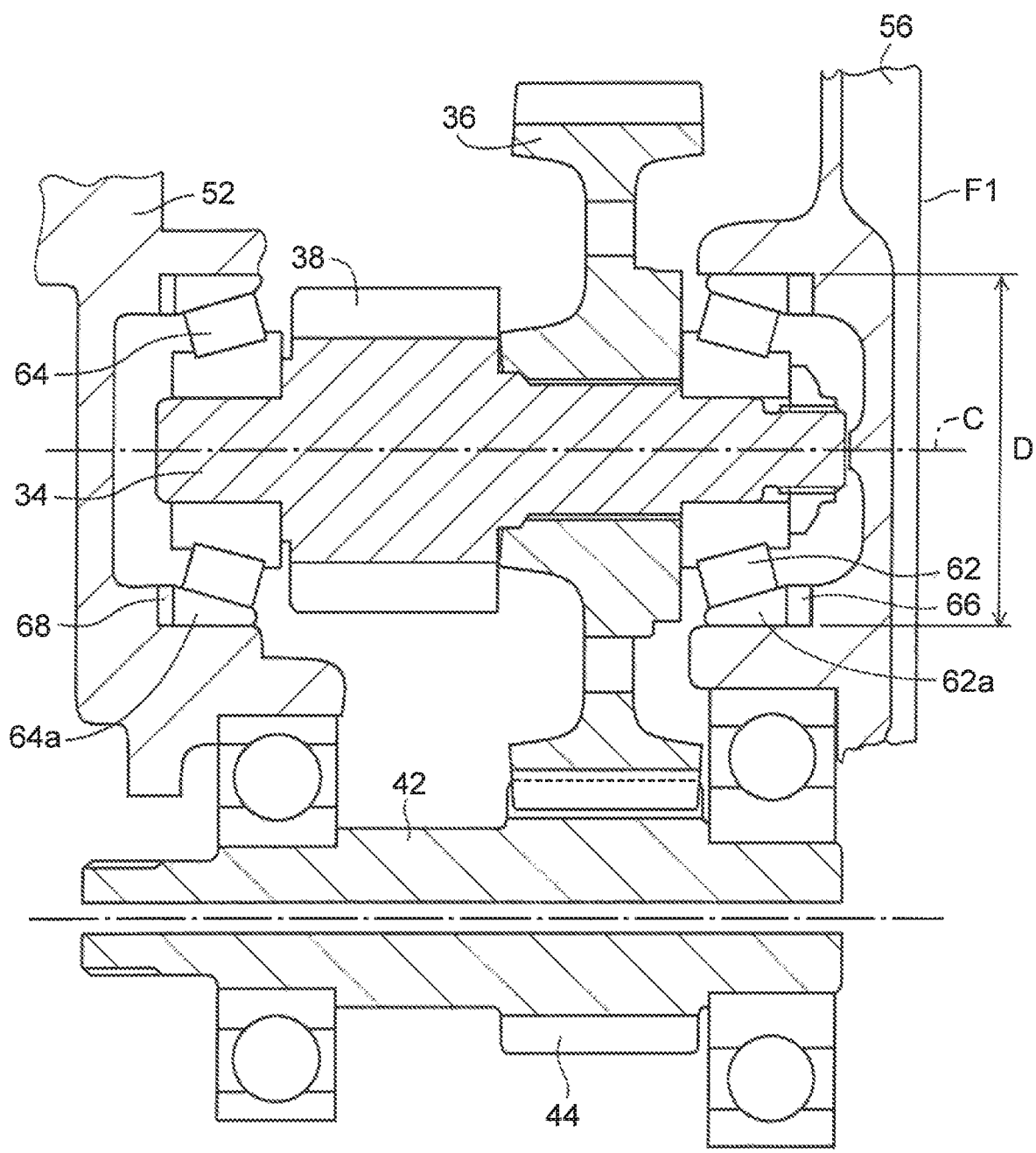
FIG. 2 is a view illustrating a configuration in which a counter driven shaft is rotatably supported via tapered roller bearings while being pressurized in a direction of a rotational central axis in the skeleton diagram of FIG. 1.

FIG. 2 shows a state where the counter driven shaft 34 functioning as a rotary shaft that transmits a driving force from the engine 12 as a driving force source is rotatably supported via a pair of tapered roller bearings 62 and 64 in the transaxle case 50. Shims 66 and 68 are interposed in a direction of a rotational centerline C of the counter driven shaft 34, between an outer race 62a of the tapered roller bearing 62 and the first end cover 56, and between an outer race 64a of the tapered roller bearing 64 and the main body case 54. A preload of a preset magnitude in the direction of the rotational centerline C is applied to the counter driven shaft 34 and the pair of the tapered roller bearings 62 and 64 that rotatably support the counter driven shaft 34.

Figure 3:
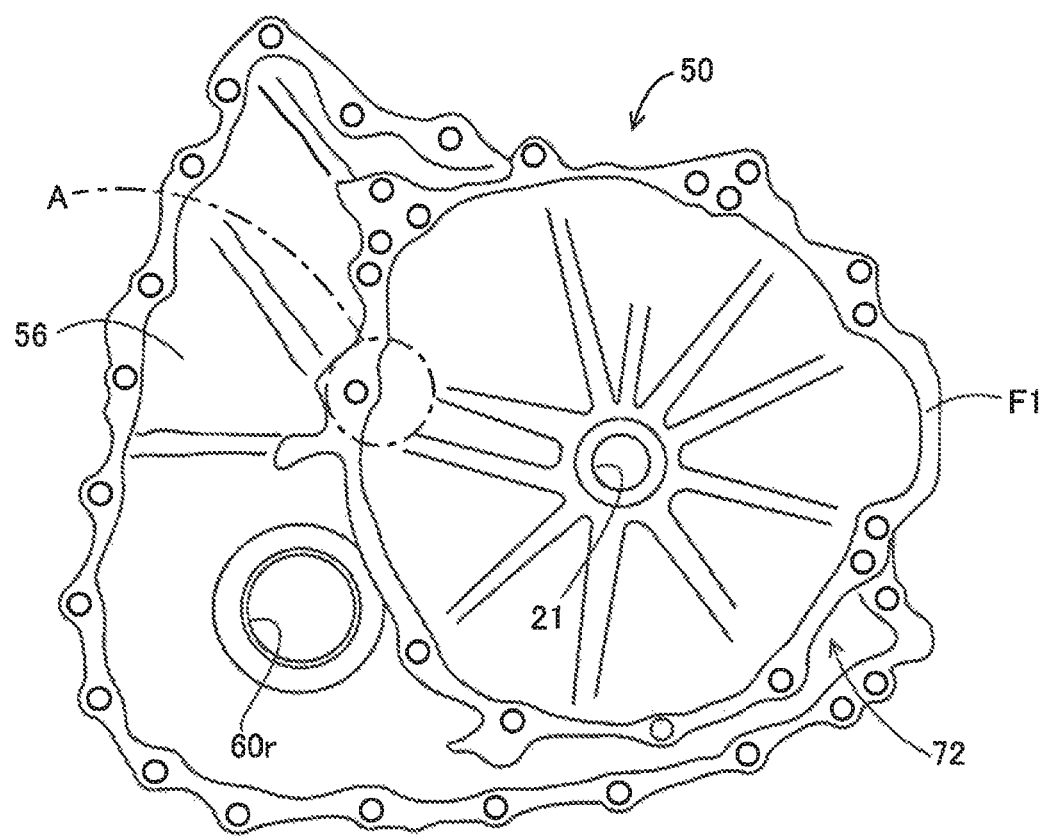
FIG. 3 is a front view showing a first side cover that is fitted to an engine side of a transaxle case that accommodates a gear train of the power transmission device of FIG. 1.
Figure 4:
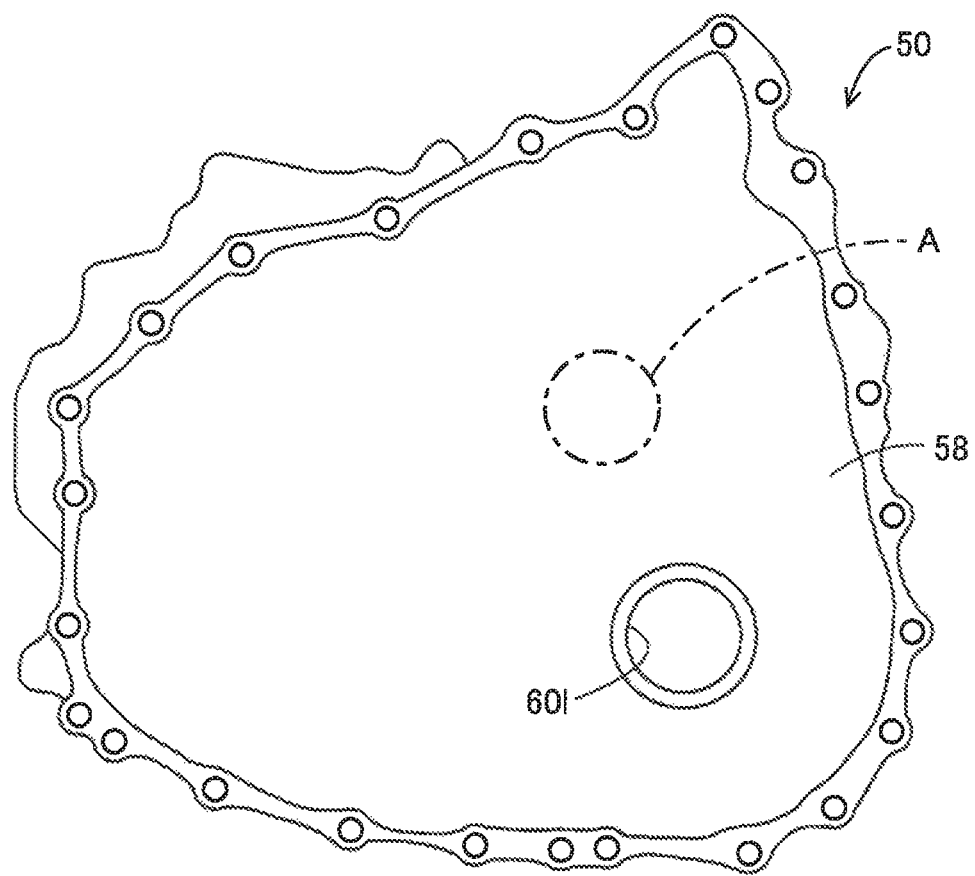
FIG. 4 is a front view showing a second side cover on the opposite side of the engine side of the transaxle case that accommodates the gear train of the power transmission device of FIG. 1.

FIG. 3 is a view showing an end surface of the transaxle case 50 on the engine 12 side, namely, the first end cover 56. Besides, FIG. 4 is a view showing an end surface of the transaxle case 50 on the opposite side of the engine 12 side, namely, the second end cover 58. In each of FIGS. 3 and 4, a region on the rotational centerline C, namely, a region A corresponding to an outer diameter D of the outer races 62a and 64a of the pair of the tapered roller bearings 62 and 64 that rotatably support the counter driven shaft 34 is indicated by a circle of an alternate long and short dash line. The foregoing rotational centerline C passes through the center of this region A. This region A is a part that locally receives the reaction force of the preload in the direction of the rotational centerline C.

Figure 5:
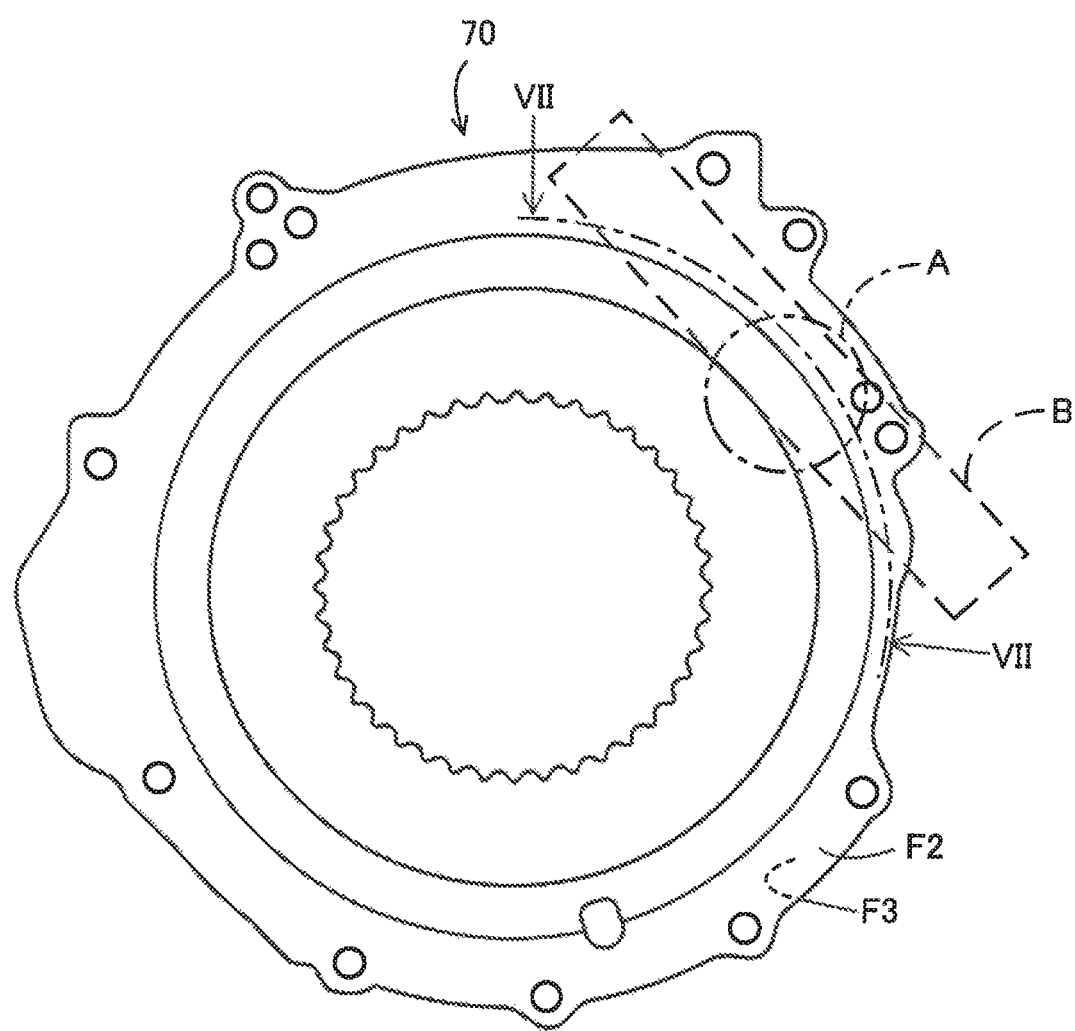
FIG. 5 is a front view showing a fixed plate that is fitted between an assembled surface that is formed on an outer surface of the first side cover of FIG. 3 and the engine.

As shown in FIG. 3, with a view to fastening the engine 12 to the first end cover 56 via a fixed plate (fixed component) 70 of FIG. 5 via a bolt, a rib 72 as an annular convex streak having a flat assembled surface (a first assembled surface) F1 formed on a summit thereof is formed around the input shaft through-hole 21 on the first end cover 56. This rib 72 is passed through the interior of the region A indicated by the circle of the alternate long and short dash line, for example, the center of the region A or the vicinity thereof. This rib 72 protrudes toward the engine 12 side, is locally large in thickness, and hence also has the function of reinforcing the first end cover 56. The fixed plate 70 is a plate-shaped component corresponding to an fixed component that is fastened to the first end cover 56, and functions as, for example, the stator of the one-way clutch F0.

Figure 6:
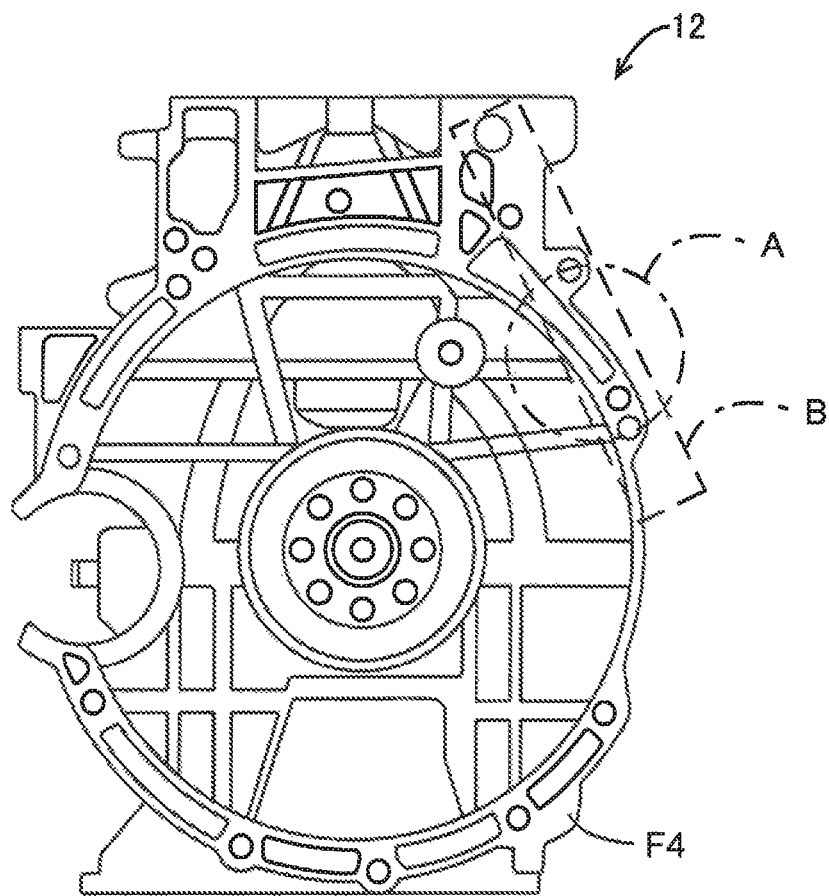
FIG. 6 is a view of the engine that is fastened, via the fixed plate of FIG. 5, to the assembled surface that is formed on the outer surface of the first side cover of FIG. 3, as viewed from the assembled surface side.

In FIG. 5, an annular flat assembled surface (a second assembled surface) F2 that is similar to the assembled surface F1 is formed on an outer peripheral thick portion of a surface of the fixed plate 70 on the first end cover 56 side. The assembled surfaces F1 and F2 are assembled with each other in a close contact state with a predetermined sealing material sandwiched therebetween. Besides, an annular flat assembled surface (a third assembled surface) F3 that is similar to an assembled surface (a fourth assembled surface) F4 formed on the engine 12 of FIG. 6 is formed on an outer peripheral thick portion of a surface of the fixed plate 70 on the engine 12 side, namely, a back surface of the fixed plate 70 of FIG. 5. The assembled surfaces F3 and F4 are assembled with each other in a close contact state with a predetermined sealing material sandwiched therebetween.

Figure 7:
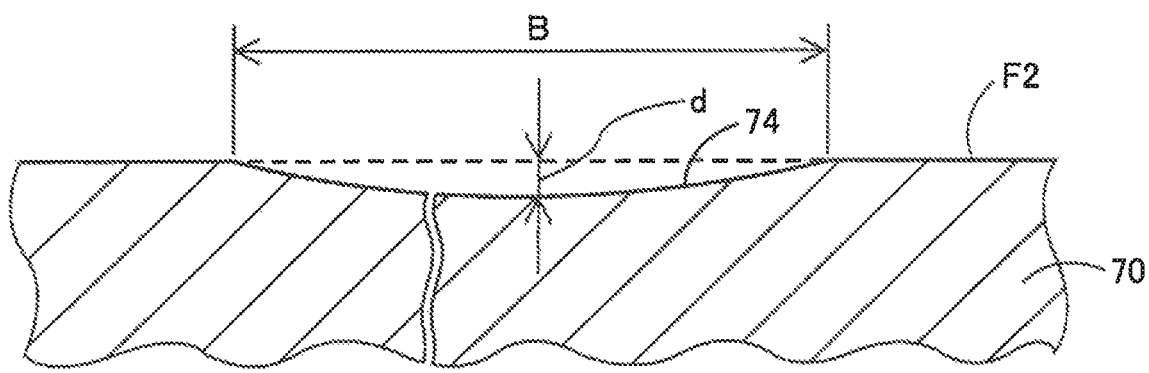
FIG. 7 is a schematic view illustrating a concave portion that is locally formed in at least one of assembled surfaces of the fixed plate of FIG. 5.

In the present embodiment of the disclosure, a local concave portion 74 is formed in an oblong region B that includes the region A in a direction along the rib 72 and that is indicated by a broken line, in the assembled surface F2 that is formed on the outer peripheral thick portion of the surface of the fixed plate 70 of FIG. 5 on the first end cover 56 side. As shown in, for example, FIG. 7, the concave portion 74 has a depth d of, for example, about 100 to 300 μm below the other parts of the assembled surface F2. FIG. 7 shows, in a developed manner, a VII-VII cross-section of FIG. 5 along a centerline in a width direction of the assembled surface F2.

Figure 8:
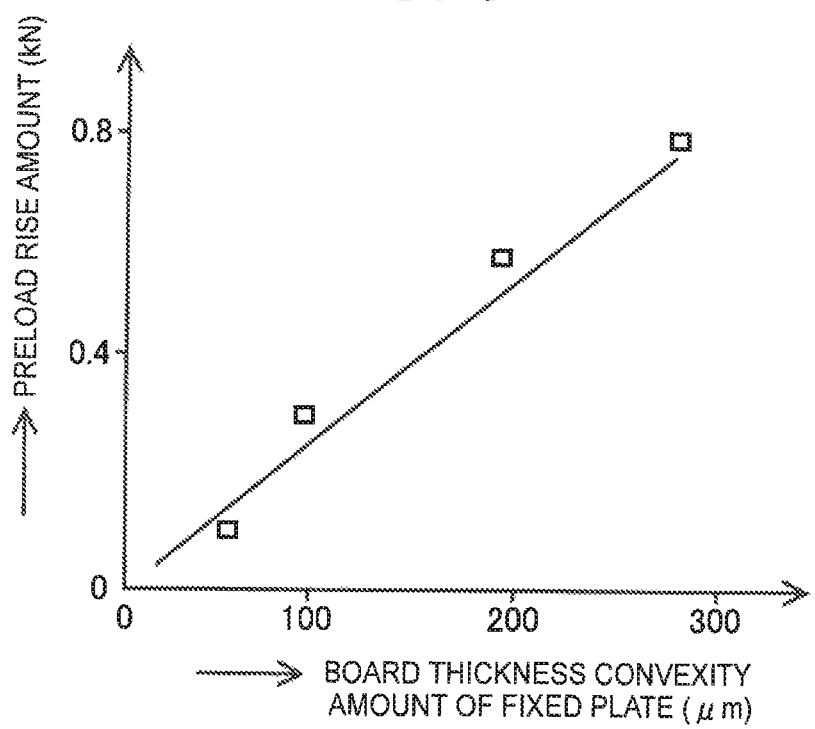
FIG. 8 is a view showing an experimental example showing an amount of increase in a preload that is applied to the tapered roller bearings when a convex portion is formed on the assembled surface.

FIG. 8 shows a relationship between a convexity amount (a board thickness convexity amount) of a convex portion that is locally formed on the assembled surface of the fixed plate and an amount of increase in a preload applied to the pair of the tapered roller bearings 62 and 64. This relationship is confirmed in advance through an experiment. The depth d of the concave portion 74 is set such that the amount of increase in the preload does not cause a deterioration in the anti-seizure performance of the tapered roller bearings 62 and 64 even at the time of use at low temperatures when the amount of increase in the preload is maximized.

Figure 9:
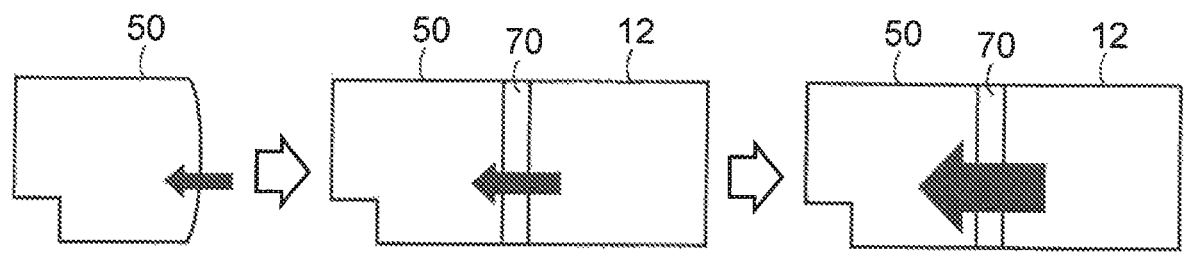
FIG. 9 is a view illustrating how the preload applied to the tapered roller bearings of FIG. 2 changes when the engine is fastened to the transaxle case via the fixed plate of FIG. 5, in a conventional vehicular power transmission device that has no concave portion formed in an assembled surface thereof.
Figure 10:
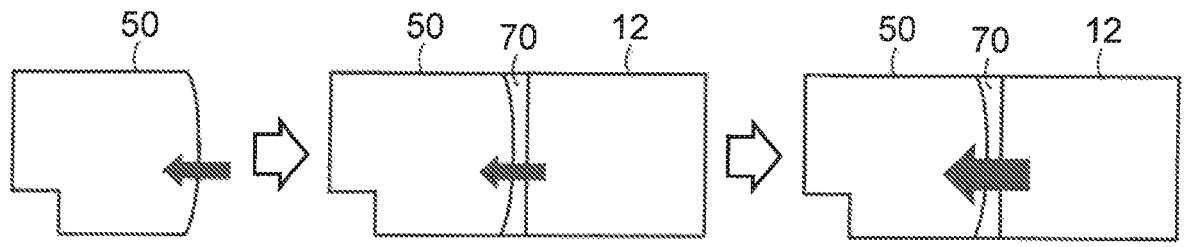
FIG. 10 is a view illustrating how the preload applied to the tapered roller bearings of FIG. 2 changes when the engine is fastened to the transaxle case via the fixed plate of FIG. 5, in the vehicular power transmission device of FIG. 1.

Each of FIGS. 9 and 10 is a schematic view illustrating the operation and effect of the concave portion 74. FIG. 9 is a schematic view illustrating how the preload increases in an assembled state of the transaxle case 50, the fixed plate 70, and the engine 12 in the case where the concave portion 74 is not provided, as the size of each black arrow increases. FIG. 10 is a schematic view illustrating how the preload increases in an assembled state of the transaxle case 50, the fixed plate 70, and the engine 12 in the case where the concave portion 74 is provided, as the size of each black arrow increases.

In FIG. 9, with the transaxle case 50 alone, the first end cover 56 of the transaxle case 50 is slightly elastically deformed toward the engine 12 side due to the preload applied to the tapered roller bearings 62 and 64. In this state, when the fixed plate 70 and the engine 12 are fastened to the assembled surface of the first end cover 56, the first end cover 56 is pressed in such a direction that the amount of elastic deformation thereof decreases, so the preload increases correspondingly. Furthermore, when the ambient temperature becomes as low as, for example, about −30° C., the aforementioned preload further increases due to the difference in thermal expansion between the material (aluminum alloy) of the transaxle case 50 and the material (steel material) of the counter driven shaft 34 and the pair of the tapered roller bearings 62 and 64 that rotatably support the counter driven shaft 34. This increase in the preload causes a deterioration in the anti-seizure performance.

In FIG. 10 as well as FIG. 9, with the transaxle case 50 alone, the first end cover 56 of the transaxle case 50 is slightly elastically deformed toward the engine 12 side, due to the preload applied to the tapered roller bearings 62 and 64. In this state, even when the fixed plate 70 and the engine 12 are fastened to the assembled surface of the first end cover 56, elastic deformation of the first end cover 56 is maintained by the concave portion 74, so the preload is restrained from increasing. Furthermore, when the ambient temperature becomes as low as, for example, about −30° C., the aforementioned preload further increases due to the difference in thermal expansion between the material (aluminum alloy) of the transaxle case 50 and the material (steel material) of the counter driven shaft 34 and the pair of the tapered roller bearings 62 and 64 that rotatably support the counter driven shaft 34, but the preload is restrained from increasing at the time of assembly. Therefore, as a result, the preload is more restrained from increasing than in FIG. 9, when the temperature is low.

As described above, with the power transmission device 10 according to the present embodiment of the disclosure, the concave portion 74 is locally provided in the assembled surface F2 of the fixed plate (the fixed component) 70, in the region B including the region A, which corresponds to the outer race 62a of the tapered roller bearing 62, in the direction along the rib 72. Therefore, with the fixed plate 70 fastened to the assembled surface F1 formed on the rib (the convex streak) 72, the clearance between the assembled surfaces F1 and F2 that face each other is enlarged in the region B where the concave portion 74 is formed. Accordingly, when the preload of the tapered roller bearings 62 and 64 increases due to the fastening of the fixed plate 70 or the attainment of a low temperature as well as the fastening of the fixed plate 70, the region B including the region A, which corresponds to the outer diameter D of the outer race 62a of the tapered roller bearing 62 on the end surface of the transaxle case (the case member) 50, can escape into the enlarged clearance. Thus, the preload applied to the tapered roller bearings 62 and 64 is restrained from increasing, so the anti-seizure performance of the tapered roller bearings 62 and 64 is restrained from deteriorating.

Next, another one of the embodiments of the disclosure will be described. Incidentally, in the following embodiment of the disclosure, components common to those of the foregoing embodiment of the disclosure will be denoted by the same reference symbols respectively, and description thereof will be omitted.

Figure 11:
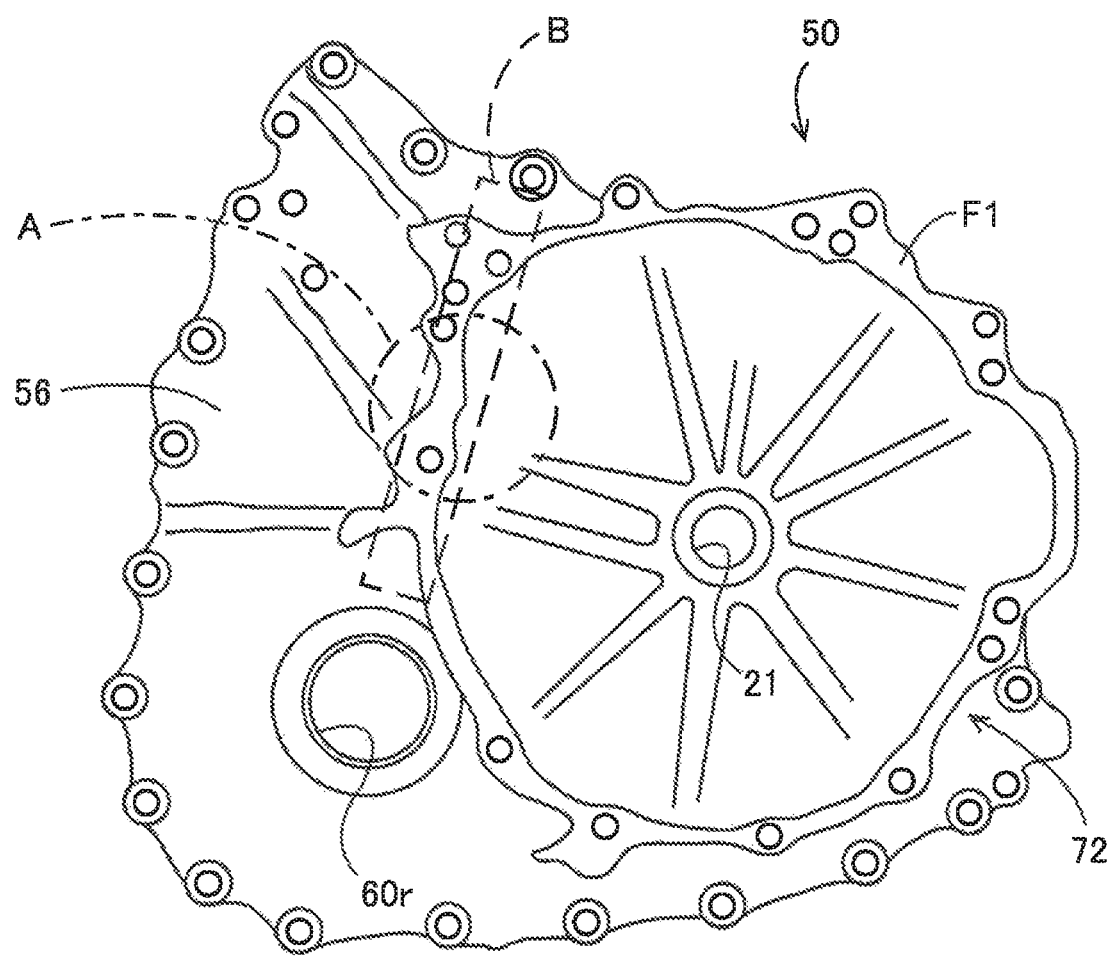
FIG. 11 is a front view showing a first side cover that is fitted to an engine side of a transaxle case that accommodates a gear train of the power transmission device of FIG. 1 in another one of the embodiments of the disclosure.

FIG. 11 shows the first end cover 56, namely, the end surface of the transaxle case 50 according to the present embodiment of the disclosure on the engine 12 side. The concave portion 74 as shown in FIG. 7 is locally provided in the flat assembled surface F1 that is formed on the summit of the rib 72 of the first end cover 56 according to the present embodiment of the disclosure, in the region B including the region A, which corresponds to the outer race 62a of the tapered roller bearing 62, in the direction along the rib 72, namely, in the direction along the first assembled surface F1.

In the present embodiment of the disclosure, the engine 12 shown in FIG. 6 is directly fastened to the assembled surface F1 of the first end cover 56. The concave portion 74 as shown in FIG. 7 is formed in the assembled surface F4 of this engine 12, in the region B including the region A, which corresponds to the outer race 62a of the tapered roller bearing 62, in the direction along the rib 72, namely, in the direction along the fourth assembled surface F4.

With the vehicular power transmission device 10 according to the present embodiment of the disclosure, the engine 12 is directly fastened to the first end cover 56, and the concave portion 74 is formed in each of the flat assembled surface F1 that is formed on the summit of the rib 72 of the first end cover 56 and the assembled surface F4 (equivalent of a second assembled surface) of the engine. As described hitherto, the concave portion 74 is formed in each of the assembled surface F1 of the first end cover 56 and the assembled surface F4 of the engine, in the region B including the region A, which corresponds to the outer race 62a of the tapered roller bearing 62, in the direction along the rib 72. Thus, the clearance between the assembled surfaces F1 and F4, which correspond to the region A corresponding to the outer race 62a of the tapered roller bearing 62, is enlarged. Thus, when the preload increases due to the attainment of a low temperature as well as the fastening of the engine 12 while the engine 12 is fastened to the transaxle case 50 with the assembled surface F4 of the engine 12 and the assembled surface F1 of the first end cover 56 in close contact with each other, the region A that protrudes from the end surface of the transaxle case 50 due to the preload can favorably escape into the aforementioned enlarged clearance.

The disclosure has been described in detail with reference to the graph and drawings. However, the disclosure can also be carried out in other aspects thereof, and can be subjected to various alterations within such a range as not to depart from the gist thereof.

For example, with the power transmission device 10 according to the foregoing first embodiment of the disclosure, the concave portion 74 is locally provided in the assembled surface F2 of the fixed plate 70, in the region B including the region A, which corresponds to the outer race 62a of the tapered roller bearing 62, in the direction along the rib 72. Besides, with the power transmission device 10 according to the second embodiment of the disclosure, the concave portion 74 is locally provided in each of the assembled surface F1 that is formed on the rib (the convex streak) 72 and the assembled surface F4 of the engine 12, in the region B including the region A, which corresponds to the outer race 62a of the tapered roller bearing 62, in the direction along the rib 72. However, the concave portion 74 may be formed in a similar location of the assembled surface F1 that is formed on the rib (the convex streak) 72 or the assembled surface F3 of the fixed plate 70. In short, the concave portion 74 may be locally provided in at least one of the assembled surface F1 that is formed on the rib (the convex streak) 72, the assembled surface F2 of the fixed plate 70, the assembled surface F3 of the fixed plate 70, and the assembled surface F4 of the engine 12, in the region B including the region A corresponding to the outer race 62a of the tapered roller bearing 62.

Besides, the concave portion 74 of the foregoing embodiment of the disclosure is provided in the assembled surface F1, F2, F3, and F4 in the region B including the region A corresponding to the outer race 62a of the tapered roller bearing 62. This region B is preferably set larger than the region A in the direction along the rib 72, but it is set how much larger the region B should be made than the region A or which one of the directions along the rib 72 should be selected as a direction in which the region B is extended with respect to the region A, in accordance with the thick portion that is locally provided on the first end cover 56.

Besides, in the foregoing embodiment of the disclosure, the vehicular power transmission device 10 that fastens the engine 12 to the transaxle case 50 has been described. However, the engine 12 is not absolutely required to be fastened to the transaxle case 50. A transmission case or the like that fastens a transfer case as an fixed component may be used.

Besides, a plurality of fixed plates 70 may be interposed between the transaxle case 50 and the engine 12.

Incidentally, the foregoing is nothing more than the embodiments of the disclosure, and no more embodiments of the disclosure are exemplified. However, the disclosure can be carried out in an aspect that is subjected to various alterations and improvements based on the knowledge of those skilled in the art within such a range as not to depart from the gist thereof.

What is claimed is:
1. A vehicular power transmission device comprising:
a driving force source;
a tapered roller bearing;

a case member including an end surface, the end surface including a convex streak provided with a first assembled surface, a part of the convex streak provided on the end surface such that the part of the convex streak passes through a region corresponding to an outer race of the tapered roller bearing; a rotary shaft that transmits a driving force from the driving force source, the rotary shaft being supported in a rotating manner in a circumferential direction of the rotary shaft via the tapered roller bearing while being pressurized in a direction of a rotational centerline of the rotary shaft, in the case member, and one end of the rotary shaft being supported in a rotating manner by the end surface of the case member via the tapered roller bearing;

a fastened state where the driving force source is fastened to the first assembled surface being one of a state where the driving force source is fastened to the first assembled surface via a fixed component, and a state of where the driving force source is directly fastened to the first assembled surface; and a concave portion provided in at least one of the first assembled surface, and other assembled surfaces for fastening the driving force source, in the region corresponding to the outer race of the tapered roller bearing, the other assembled surfaces provided to one of the fixed component and the driving force source.

2. The vehicular power transmission device according to claim 1, wherein the driving force source is fastened to the first assembled surface via the fixed component, the fixed component is a plate-shaped component that is interposed between the driving force source and the end surface of the case member, the plate-shaped component includes a second assembled surface facing the first assembled surface at a side of the case member, and a third assembled surface provided at a side of the driving force source, the driving force source includes a fourth assembled surface facing the third assembled surface at a side of the plate-shaped component, and the concave portion is provided in at least one of the first assembled surface, the second assembled surface, the third assembled surface, and the fourth assembled surface.

3. The vehicular power transmission device according to claim 1, wherein the driving force source is directly fastened to the first assembled surface, the driving force source includes a fourth assembled surface facing the first assembled surface at a side of the case member, and the concave portion is provided in at least one of the first assembled surface and the fourth assembled surface.

4. The vehicular power transmission device according to claim 1, wherein the concave portion is 100 to 300 μm in depth.

* * * * *